United States Patent
Jang et al.

(10) Patent No.: US 11,682,831 B2
(45) Date of Patent: *Jun. 20, 2023

(54) COMBO ANTENNA MODULE

(71) Applicant: AMOTECH CO., LTD., Incheon (KR)

(72) Inventors: Kil Jae Jang, Seongnam-si (KR); Choi Han Kim, Incheon (KR)

(73) Assignee: AMOTECH CO., LTD., Incheon (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/715,448

(22) Filed: Apr. 7, 2022

(65) Prior Publication Data

US 2022/0238992 A1 Jul. 28, 2022

Related U.S. Application Data

(63) Continuation of application No. 16/982,510, filed as application No. PCT/KR2019/002882 on Mar. 13, 2019, now Pat. No. 11,329,370.

(30) Foreign Application Priority Data

Mar. 23, 2018 (KR) .......................... 10-2018-0033791

(51) Int. Cl.
*H01Q 1/38* (2006.01)
*H04B 5/00* (2006.01)
(Continued)

(52) U.S. Cl.
CPC ............... *H01Q 1/38* (2013.01); *H01Q 1/24* (2013.01); *H01Q 7/06* (2013.01); *H04B 5/0037* (2013.01)

(58) Field of Classification Search
CPC ... H01Q 1/38; H01Q 1/24; H01Q 7/06; H04B 5/0037; H04B 5/00
See application file for complete search history.

(56) References Cited

U.S. PATENT DOCUMENTS

| 10,658,740 B2 | 5/2020 | Noh et al. |
| 11,329,370 B2* | 5/2022 | Jang .......................... H01Q 1/24 |
| 2014/0333253 A1 | 11/2014 | Suzuki et al. |

FOREIGN PATENT DOCUMENTS

| KR | 10-2014-0090045 A | 7/2014 |
| KR | 10-2017-0022421 A | 3/2017 |

(Continued)

OTHER PUBLICATIONS

KR Office Action dated Nov. 27, 2019 as received in Application No. 10-2018-0033791.

(Continued)

*Primary Examiner* — Robert L Deberadinis
(74) *Attorney, Agent, or Firm* — Maschoff Brennan

(57) ABSTRACT

Disclosed is a combo antenna module in which an accommodation groove is formed in a coil pattern and a connection pattern connected to a coil pattern disposed on another surface is disposed in the accommodation groove so as to minimize a mounting space and provide antenna performance greater than or equal to that of a conventional antenna module. The disclosed combo antenna module comprises a coil pattern for short-range communication and a coil pattern for wireless power transmission. The coil pattern for wireless power transmission has the accommodation groove formed by varying the line width of the coil pattern disposed on one surface, and the connection pattern for connecting the coil patterns disposed on the other surface is disposed in the accommodation groove so as to minimize a mounting space and provide antenna performance greater than or equal to that of a conventional antenna module.

9 Claims, 10 Drawing Sheets

(51) Int. Cl.
*H01Q 1/24* (2006.01)
*H01Q 7/06* (2006.01)

(56) References Cited

FOREIGN PATENT DOCUMENTS

| KR | 10-2017-0093670 A | 8/2017 |
|----|-------------------|--------|
| KR | 10-1795545 B | 11/2017 |
| KR | 10-2018-0017675 A | 2/2018 |

OTHER PUBLICATIONS

IN Office Action in Application No. 202017038500 dated Apr. 30, 2021.
International Search Report and Written Opinion in Application No. PCT/KR2019/002882 dated Jul. 4, 2019.

\* cited by examiner

[FIG. 1]
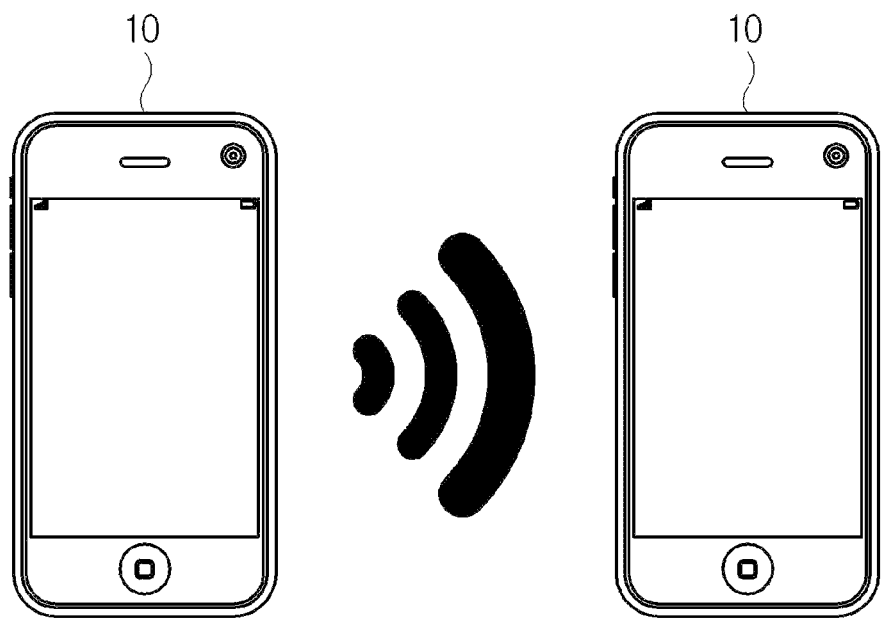

[FIG. 2]
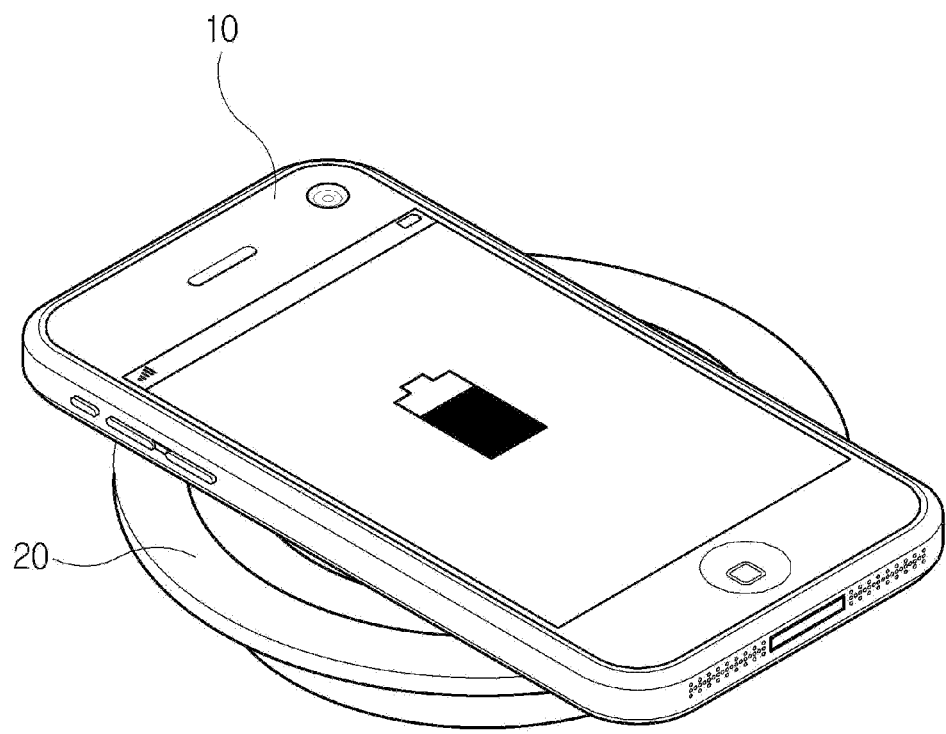

[FIG. 3]
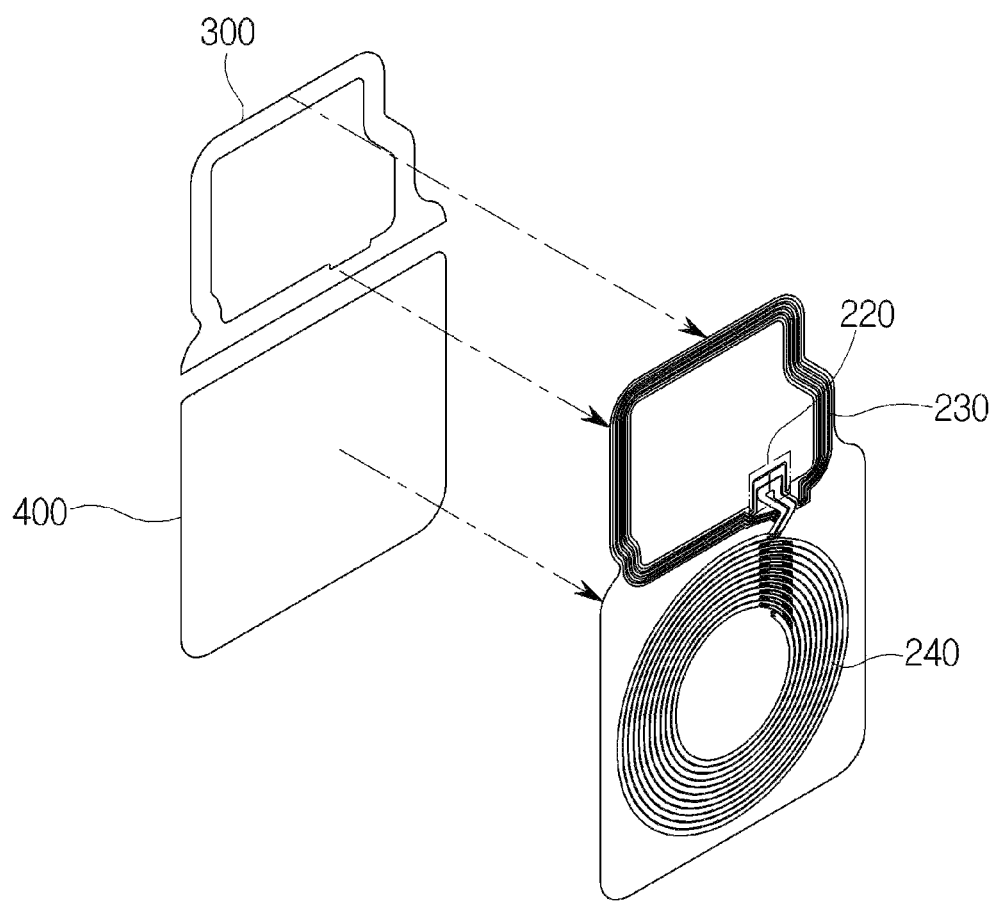

[FIG. 4]
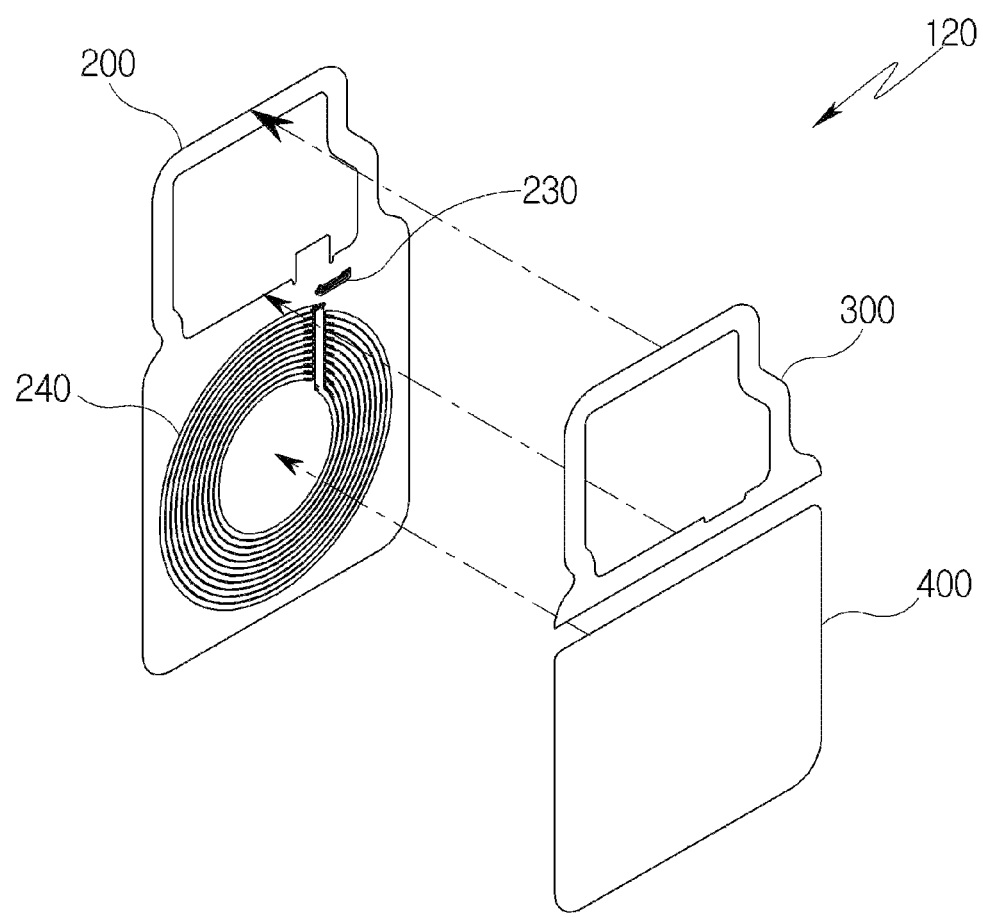

[FIG. 5]
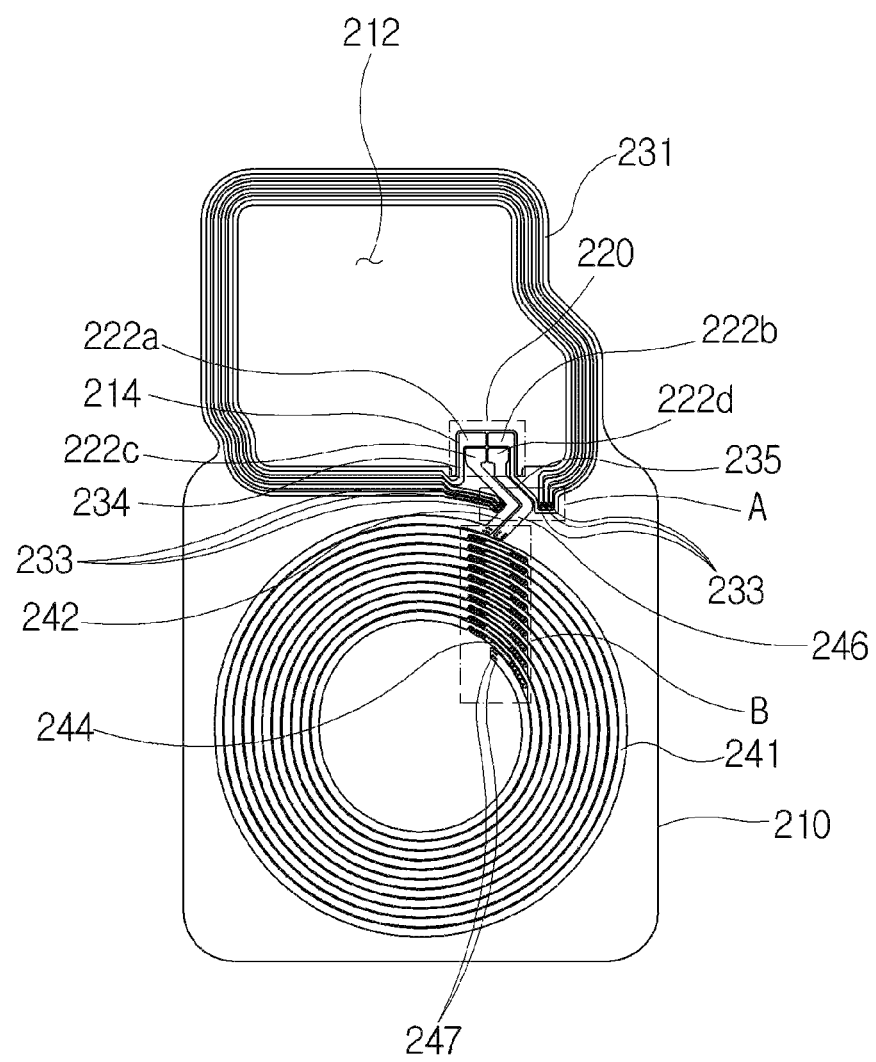

[FIG. 6]
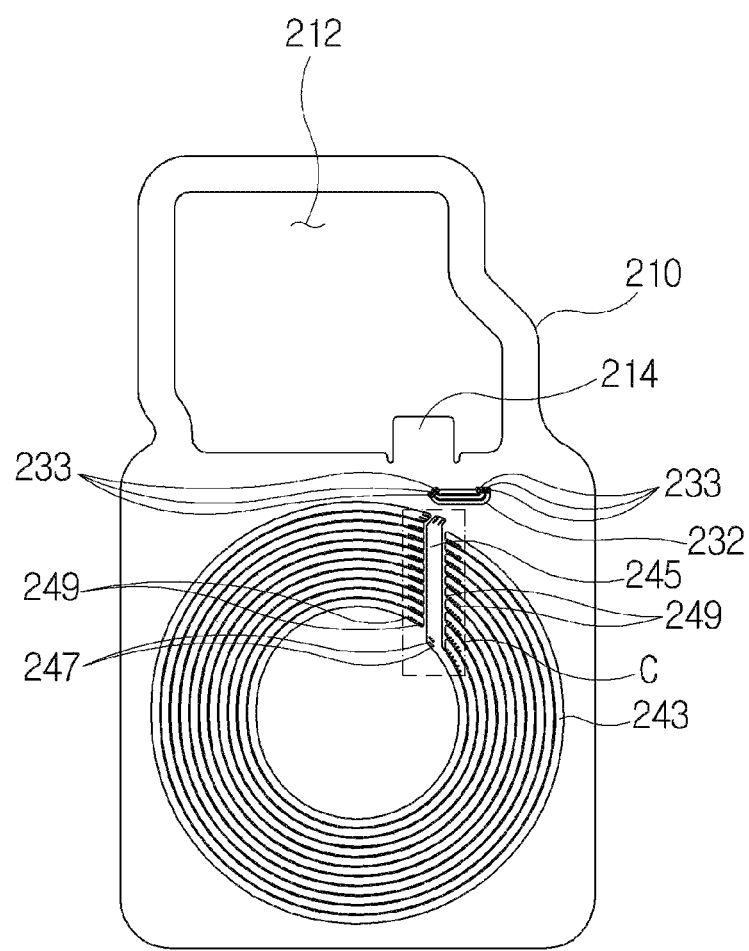

[FIG. 7]
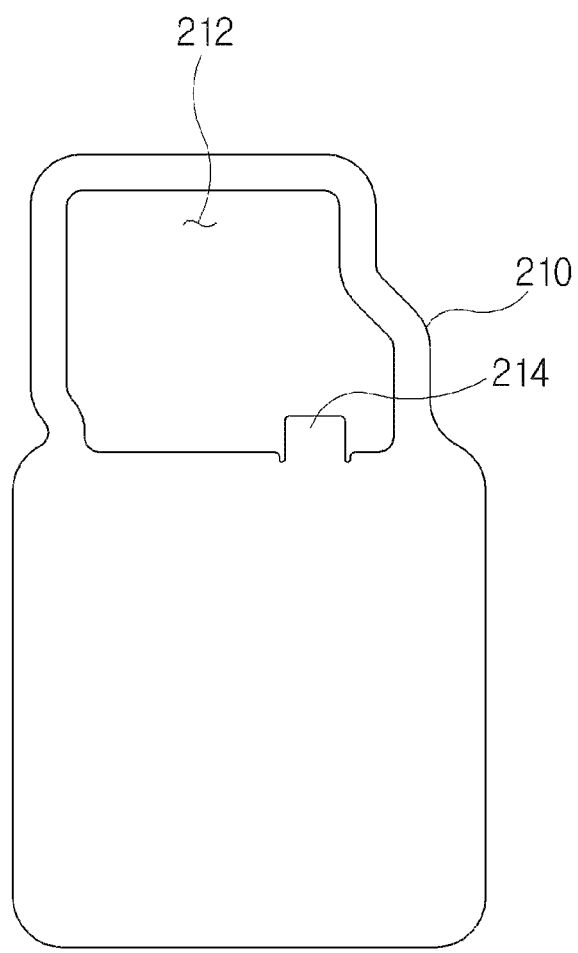

[FIG. 8]
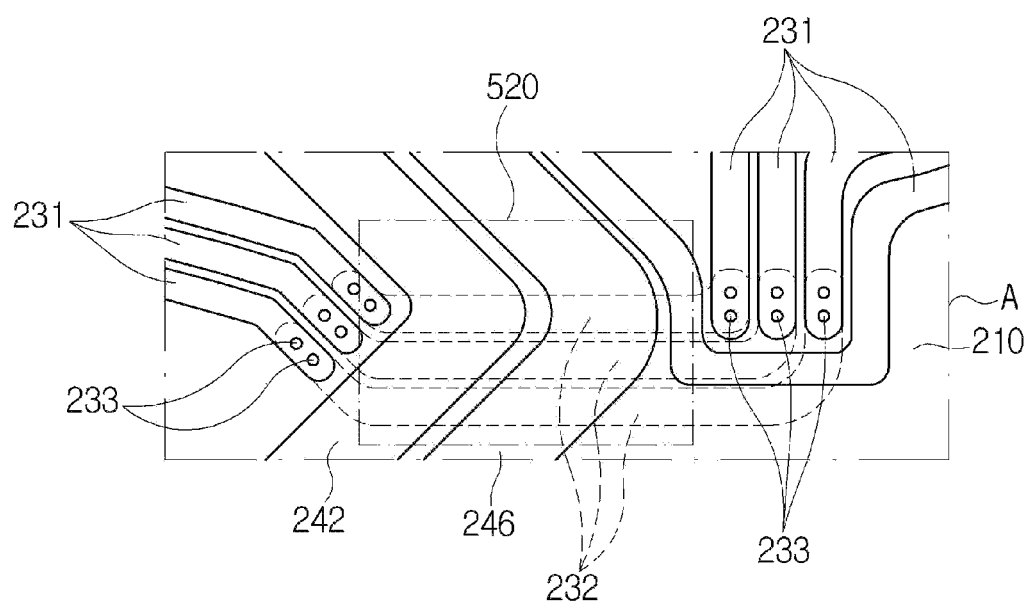

[FIG. 9]
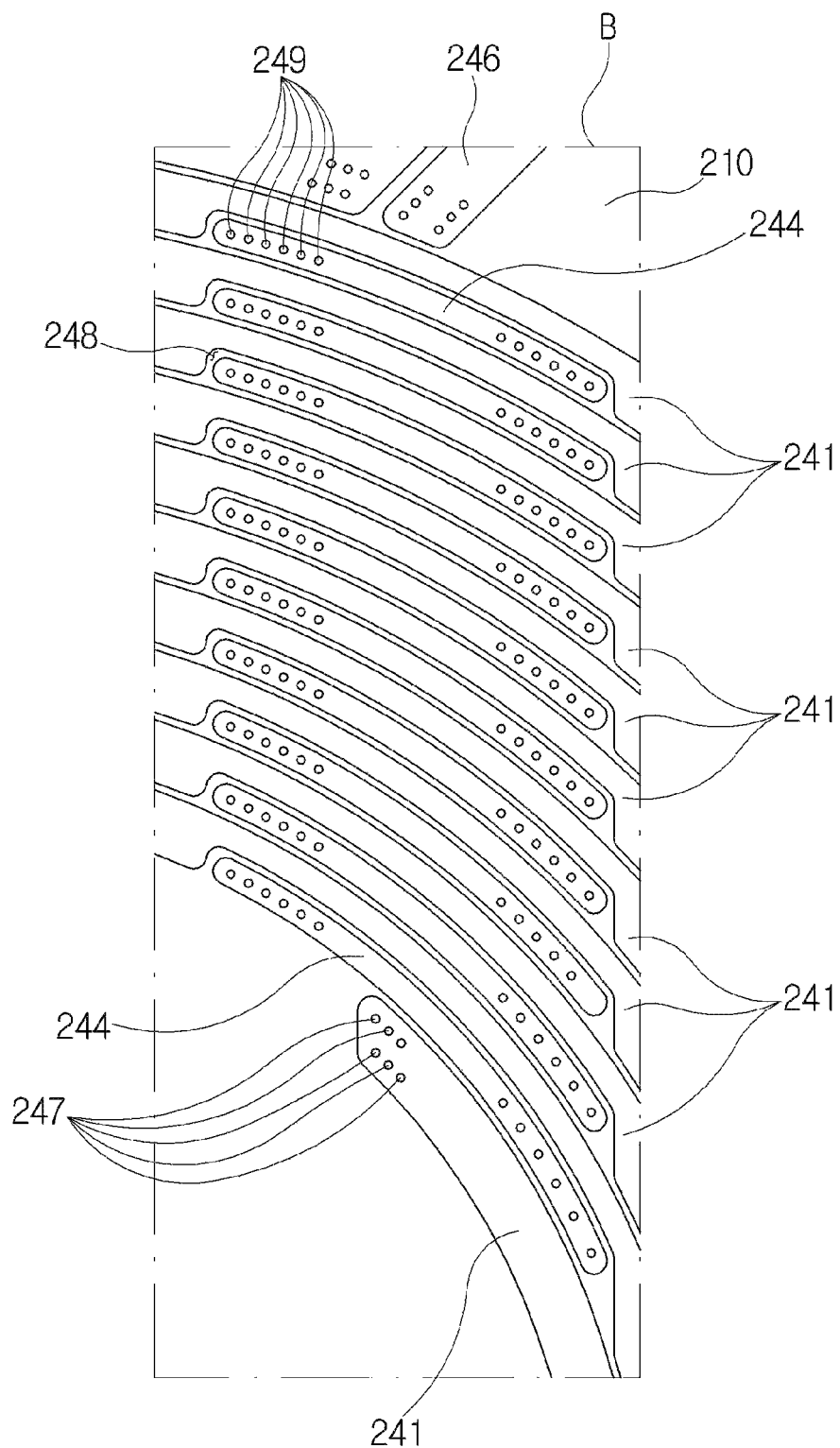

[FIG. 10]
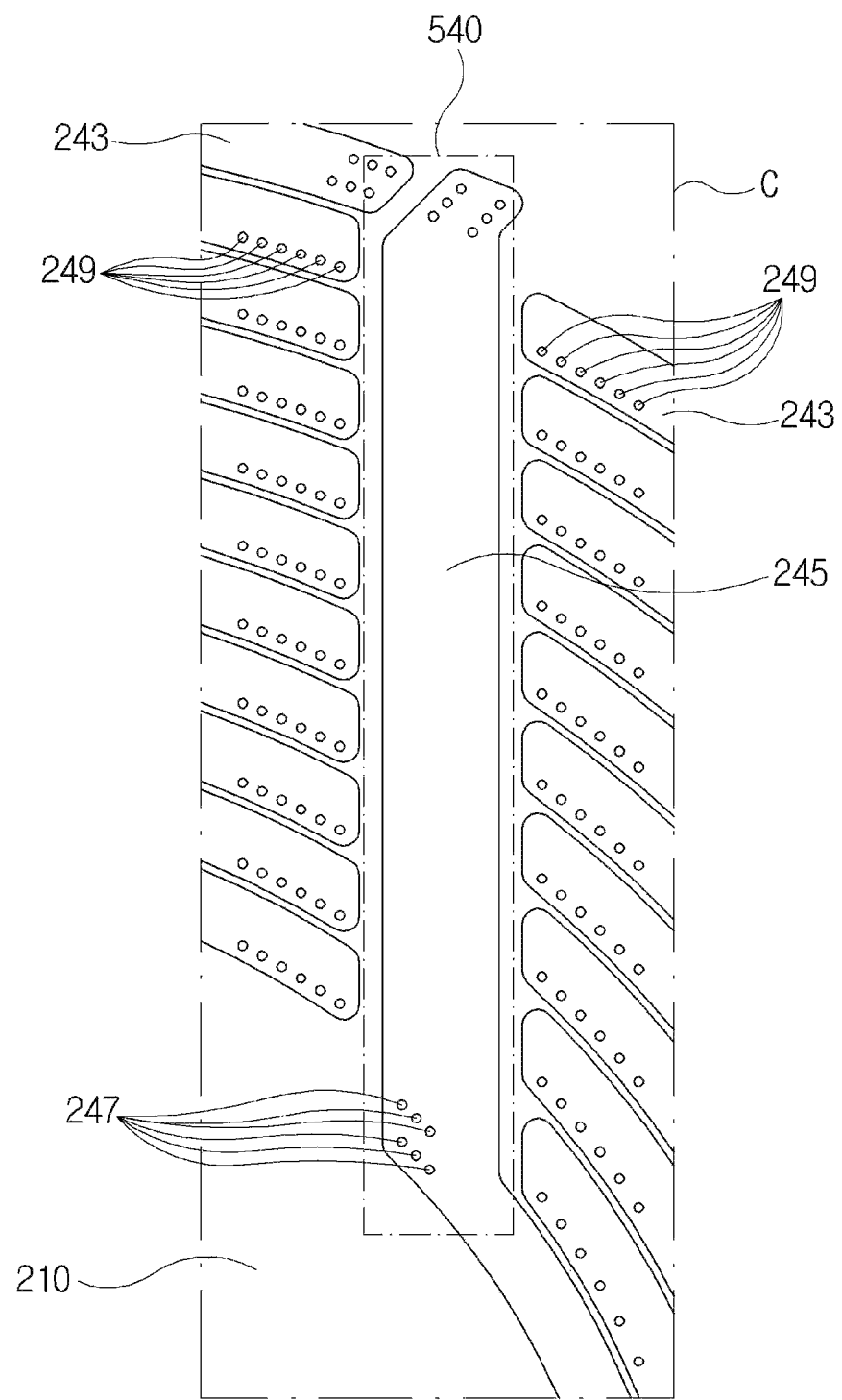

COMBO ANTENNA MODULE

TECHNICAL FIELD

The present disclosure relates to a combo antenna module, and more particularly, to a combo antenna module mounted on a portable terminal to perform wireless power transmission and short-range communication.

BACKGROUND ART

With the development of technology, a short-range communication function and a wireless power transmission (or wireless charging) function are being applied to a portable terminal. That is, the portable terminal transmits and receives data to and from other electronic devices using the short-range communication (for example, NFC) function, and charges a built-in battery using the wireless power transmission (or wireless charging) function.

Meanwhile, since the portable terminal market requires miniaturization and thinning of the portable terminal, the size and thickness of the portable terminal are decreased, so that the mounting space of internal components is decreased.

According to the market demand, various types of antenna modules having antenna performance equal to or greater than that of a conventional antenna module while minimizing the mounting space are being developed.

DISCLOSURE

Technical Problem

The present disclosure is proposed to solve the above conventional problems, and an object of the present disclosure is to provide a combo antenna module, which forms an accommodation groove in a coil pattern, and disposes a connection pattern connected with the coil pattern disposed on the other surface in the accommodation groove, thereby minimizing a mounting space of the antenna module and providing antenna performance equal to or greater than that of a conventional antenna module.

Technical Solution

A combo antenna module according to an exemplary embodiment of the present disclosure for achieving the object may include a coil pattern for short-range communication disposed on one surface of a base substrate and a coil pattern for wireless power transmissions disposed on both surfaces of the base substrate.

The coil pattern for wireless power transmission may have an accommodation groove formed by varying the line width of the coil pattern disposed on one surface of the base substrate. The coil pattern for wireless power transmission may have a connection pattern connecting the coil pattern disposed on the rear surface of the base substrate disposed in the accommodation groove. At this time, the coil pattern and the connection pattern disposed on the rear surface of the base substrate may be connected through a via hole. A plurality of via holes may be configured, thereby securing the connection stability between the coil patterns.

Advantageous Effects

According to the present disclosure, the combo antenna module may have the connection pattern disposed in the accommodation groove of the coil pattern, minimizing the mounting space of the antenna module and providing the antenna performance equal to or greater than that of the conventional antenna module.

In addition, the combo antenna module may have the terminal formed in the inner circumferential region of the coil pattern for short-range communication, and have the coil pattern for wireless power transmission connected to the terminal through the through path formed by the coil pattern for short-range communication, thereby minimizing the change in resistance caused by the disconnection of the coil pattern.

In addition, the combo antenna module may have the terminal formed in the inner circumferential region of the coil pattern for short-range communication, and have the coil pattern for wireless power transmission connected to the terminal through the through path formed by the coil pattern for short-range communication, thereby minimizing the change in resistance of the coil pattern to minimize the change in efficiency of the antenna performance.

In addition, the combo antenna module may have the terminal formed in the inner circumferential region of the coil pattern for short-range communication, and have the coil pattern for wireless power transmission connected to the terminal through the through path formed by the coil pattern for short-range communication, thereby minimizing the mounting space of the antenna module and providing the antenna performance equal to or greater than that of the conventional antenna module.

In addition, the combo antenna module may constantly maintain the interval between the coil patterns, thereby minimizing the mounting space of the antenna module to improve the mass productivity and preventing the occurrence of the short circuit between the coil patterns.

In addition, the combo antenna module may connect the patterns formed on one surface and the other surface of the base substrate through the plurality of via holes, thereby securing the connection stability between the patterns and improving the communication performance of the antenna module.

DESCRIPTION OF DRAWINGS

FIGS. 1 and 2 are diagram for explaining an example of applying a combo antenna module according to an exemplary embodiment of the present disclosure.

FIGS. 3 and 4 are diagrams for explaining the combo antenna module according to the exemplary embodiment of the present disclosure.

FIGS. 5 and 6 are diagrams for explaining an antenna sheet illustrated in FIG. 3.

FIG. 7 is a diagram for explaining a base sheet illustrated in FIG. 5.

FIG. 8 is an enlarged diagram of a region A illustrated in FIG. 5 for explaining a coil pattern for short-range communication.

FIG. 9 is an enlarged diagram of a region B illustrated in FIG. 5 for explaining a coil pattern for wireless power transmission.

FIG. 10 is an enlarged diagram of a region C illustrated in FIG. 6 for explaining the coil pattern for wireless power transmission.

MODE FOR INVENTION

Hereinafter, the most preferred exemplary embodiments of the present disclosure will be described with reference to the accompanying drawings in order to specifically describe the exemplary embodiments so that those skilled in the art to which the present disclosure pertains may easily implement the technical spirit of the present disclosure. First, in adding reference numerals to the components of each drawing, it should be noted that the same components have the same reference numerals as much as possible even if they are displayed in different drawings. In addition, in describing the present disclosure, when it is determined that the detailed description of the related well-known configuration or function may obscure the gist of the present disclosure, the detailed description thereof will be omitted.

Referring to FIG. 1, a combo antenna module according to an exemplary embodiment of the present disclosure is embedded in a portable terminal 10 to perform short-range communication. That is, the combo antenna module is embedded in the portable terminal 10 to transmit and receive data to and from the antenna module embedded in the other portable terminal 10. At this time, as an example, the combo antenna module transmits and receives data wirelessly through a near field communication (NFC) method.

Referring to FIG. 2, the combo antenna module according to the exemplary embodiment of the present disclosure is embedded in the portable terminal 10 to transmit and receive power wirelessly. That is, the combo antenna module is embedded in the portable terminal 10 to wirelessly receive power from a wireless power transmission antenna embedded in a charging device 20. The combo antenna module may also wirelessly transmit power to the wireless power transmission antenna embedded in the other portable terminal 10. At this time, as an example, the combo antenna module transmits and receives power wirelessly through a wireless power consortium (WPC) method.

Referring to FIGS. 3 and 4, the combo antenna module 100 according to the exemplary embodiment of the present disclosure is configured to include an antenna sheet 200, a first magnetic member 300, and a second magnetic member 400. At this time, an adhesive substrate (not illustrated) may also be interposed between the antenna sheet 200 and the first magnetic member 300, and between the antenna sheet 200 and the second magnetic member 400.

Referring to FIGS. 5 and 6, the antenna sheet 200 is configured to include a base substrate 210, a terminal member 220, a coil pattern for short-range communication 230, and a coil pattern for wireless power transmission 240. Hereinafter, one surface of the base substrate 210 is one of the upper surface and the lower surface of the base substrate 210, and the other surface of the base substrate 210 is the other one of the upper surface and the lower surface of the base substrate 210.

The base substrate 210 may be formed of a thin film substrate such as a film, a sheet, or a thin film substrate. The base substrate 210 may be a flexible printed circuit board (FPCB). As an example, the base substrate 210 is a polypropylene (PP) sheet. Here, the base substrate 210 is not limited thereto, and may be variously used as long as it is a thin film substrate and a substrate capable of forming a coil pattern configuring an antenna.

Referring to FIG. 7, the base substrate 210 may be formed with an accommodation hole 212 and a protrusion 214.

The accommodation hole 212 may be a hole through which a camera, a flash, or the like of the portable terminal 10 passes. That is, if the combo antenna module 100 is mounted on the portable terminal 10, the camera, the flash, or the like of the portable terminal 10 penetrates the accommodation hole 212 of the base substrate 210 and is disposed on the rear surface of the portable terminal 10.

The accommodation hole 212 is formed by penetrating the base substrate 210. The accommodation hole 212 is formed adjacent to the base substrate 210 at one side thereof.

The protrusion 214 has a terminal member 220 disposed on at least one of both surfaces thereof. The protrusion 214 may be formed to extend from the accommodation hole 212. The protrusion 214 may be formed to extend in the inner direction of the accommodation hole 212 (that is, a direction of the center point of the accommodation hole 212).

The terminal member 220 may include a plurality of terminals 222 connected to the coil pattern for short-range communication 230 and the coil pattern for wireless power transmission 240. The plurality of terminals 222 are disposed to be spaced apart from each other at a predetermined interval. As an example, the terminal member 220 includes a first terminal 222a and a second terminal 222b connected to both ends of the coil pattern for short-range communication 230, respectively, and a third terminal 222c and a fourth terminal 222d connected to both ends of the coil pattern for wireless power transmission 240, respectively.

The coil pattern for short-range communication 230 is a pattern for near-field communication (NFC), and disposed on one surface of the base substrate 210. The coil pattern for short-range communication 230 may be formed by drawing a spiral shape on a plane formed by the base substrate 210 (that is, one surface of the base substrate 210). The coil pattern for short-range communication 230 is disposed along the outer circumstance of the accommodation hole 212 of the base substrate 210.

A portion of the coil pattern for short-range communication 230 may be disposed on the other surface of the base substrate 210 to form a through path in which the coil pattern for wireless power transmission 240 is disposed across. Here, the through path does not mean only penetrating all of the coil patterns for short-range communication 230, but may also mean penetrating only some of the coil patterns for short-range communication 230.

The coil pattern for short-range communication 230 may include a plurality of first coil patterns 231 and a plurality of first connection patterns 232.

The plurality of first coil patterns 231 are disposed on one surface of the base substrate 210. The plurality of first coil patterns 231 may be disposed along the outer circumference of the accommodation hole 212. The plurality of first coil patterns 231 are disposed between the outer circumference of the base substrate 210 and the outer circumference of the accommodation hole 212. The plurality of first coil patterns 231 are disposed to be spaced apart from each other at a predetermined interval. Both ends of the first coil pattern 231 are disposed to face each other, and disposed to be spaced apart from each other at a predetermined interval.

The plurality of first coil patterns 231 may form a first through path 520. The first through path 520 is a region in which the coil pattern for wireless power transmission 240 is disposed across the coil pattern for short-range communication 230. As an example, the first through path 520 is a separation region between both ends of the plurality of first coil patterns 231. Here, the first through path 520 does not mean only penetrating all of the plurality of first coil patterns 231, but may also mean penetrating only some of the plurality of first coil patterns 231.

The plurality of first connection patterns 232 are disposed on the other surface of the base substrate 210. One end of the first connection pattern 232 is connected with the first coil pattern 231, and the other end of the first connection pattern 232 is connected with another first coil pattern 231.

Referring to FIG. 8, the first connection pattern 232 is disposed to overlap a portion of the first through path 520 and a portion of the first coil pattern 231. The first connection pattern 232 is connected with the two first coil patterns 231 through a first via hole 233. One end of the first connection pattern 232 is connected with the first coil pattern 231 through the first via hole 233. The other end of the first connection pattern 232 is connected with the other first coil pattern 231 through the first via hole 233.

Both ends of the coil pattern for short-range communication 230 are connected with different terminals 222 of the terminal member 220. Any one of the plurality of first coil patterns 231 is connected with any one of the plurality of terminals 222, and the other first coil pattern 231 thereof is connected with another of the plurality of terminals 222.

As an example, the first coil pattern 231 disposed closest to the accommodation hole 212 among the plurality of first coil patterns 231 passes through a first drawn-out pattern 234 to be connected with the first terminal 222a of the terminal member 220, and the first coil pattern 231 disposed closest to the outer circumference of the base substrate 210 among the plurality of first coil patterns 231 passes through a second drawn-out pattern 235 to be connected to the second terminal 222b of the terminal member 220.

With the aforementioned configuration, the coil pattern for short-range communication 230 forms a pattern having a spiral shape. A line width of the coil pattern for short-range communication 230 may be formed to be narrower than a line width of the coil pattern for wireless power transmission 240. The coil pattern for short-range communication 230 has the increased number of turns in the same area by narrowly forming the line width, thereby increasing efficiency.

At this time, since the coil pattern for short-range communication 230 is formed to have the narrow line width, an open may occur in the first via hole 233. When the open occurs in the first via hole 233, the coil pattern for short-range communication 230 has a lowered connection stability, thereby lowering the short-range communication performance.

Accordingly, in order to secure connection stability and improve communication performance, a plurality of first via holes 233 may be configured. As an example, the plurality of first via holes 233 are disposed in a line in the longitudinal direction of the first connection pattern 232.

The coil pattern for wireless power transmission 240 is a pattern for wireless power transmission (WPC), and disposed on both surfaces of the base substrate 210. The coil pattern for wireless power transmission 240 may be formed by drawing a spiral shape on one surface of the base substrate 210 and then formed by drawing the spiral shape on the other surface thereof.

The coil pattern for wireless power transmission 240 may be configured to include a second coil pattern 241, a third drawn-out pattern 242, a plurality of third coil patterns 243, a plurality of second connection patterns 244, and a fourth drawn-out pattern 245, and a fifth drawn-out pattern 246.

The second coil pattern 241 is disposed on one surface of the base substrate 210. The second coil pattern 241 is disposed to be spaced apart from the first coil pattern 231. The second coil pattern 241 may be formed by drawing a spiral shape on one surface of the base substrate 210.

One end of the second coil pattern 241 is connected to the terminal member 220 through the third drawn-out pattern 242. The other end of the second coil pattern 241 is connected with any one of the plurality of third coil patterns 243 through the second via hole 247. Here, a plurality of second via holes 247 may be configured to secure the connection stability between the second coil pattern 241 and the third coil pattern 243. If the plurality of second via holes 247 are configured, they are disposed in a line in the longitudinal direction of the second coil pattern 241.

Referring to FIG. 9, the second coil pattern 241 may be formed with a plurality of accommodation grooves 248 in which the plurality of second connection patterns 244 are accommodated. The second coil pattern 241 may have the line widths of some regions narrower than the line widths of other regions. The region having the narrower line width compared to other regions may form an accommodation groove 248. Accordingly, the second coil pattern 241 is formed to have the line width of the portion in which the accommodation groove 248 is formed narrower than the line width of the other portions. The second coil pattern 241 may have the line width, which is obtained by summing the line width of the region in which the accommodation groove 248 is formed, the line width of the second connection pattern 244, and the separation interval between the accommodation groove 248 and the second connection pattern 244, smaller than or equal to the line widths of other regions.

At this time, as the second coil pattern 241 is formed in a spiral shape, the plurality of accommodation grooves 248 are disposed to partially overlap a second through path 540 formed by the plurality of third coil patterns 243 to be described later. The second connection pattern 244 is disposed in each of the accommodation grooves 248. As an example, the separation interval between the second coil patterns 241 and the separation interval between the second coil pattern 241 and the second connection pattern 244 are the same.

The third drawn-out pattern 242 is disposed on one surface of the base substrate 210. The third drawn-out pattern 242 is disposed on the first through path 520. The third drawn-out pattern 242 is disposed across the coil pattern for short-range communication 230.

The third drawn-out pattern 242 is connected to the second coil pattern 241 and one of the plurality of terminals 222. As an example, one end of the third drawn-out pattern 242 is connected with one end of the second coil pattern 241, and the other end of the third drawn-out pattern 242 is connected to the third terminal 222c of the terminal member 220.

The plurality of third coil patterns 243 are disposed on the other surface of the base substrate 210. The plurality of third coil patterns 243 are spaced apart from each other at a predetermined interval. The plurality of third coil patterns 243 are disposed along the outer circumference of the center region of the base substrate 210, and sequentially disposed in the outer circumferential direction of the base substrate 210. One of the plurality of third coil patterns 243 disposed closest to the center region is connected to the other end of the second coil pattern 241 through the second via hole 247.

Referring to FIG. 10, the plurality of third coil patterns 243 may form the second through path 540 on the other surface of the base substrate 210. The second through path 540 is a region disposed across the plurality of third coil patterns 243. Both ends of the third coil pattern 243 are disposed to face each other, and spaced apart from each other at a predetermined interval to form a separation region. As an example, the second through path 540 is a separation region between both ends of the third coil pattern 243. Here, the second through path 540 does not mean only penetrating all of the plurality of third coil patterns 243, but may also mean penetrating only some of the plurality of third coil patterns 243.

The plurality of second connection patterns 244 are disposed on one surface of the base substrate 210. The second connection pattern 244 is disposed between the second coil patterns 241 disposed in a spiral shape. The second connection pattern 244 is accommodated in the accommodation groove 248 formed in the second coil pattern 241. The plurality of second connection patterns 244 are disposed to overlap the second through path 540 formed on the other surface of the base substrate 210. At this time, the second connection pattern 244 is disposed to be spaced apart from the adjacent second coil pattern 241 at a predetermined interval.

The second connection pattern 244 is connected with the second coil pattern 241 through the third via hole 249. Both ends of the second connection pattern 244 are connected with two different third coil patterns 243 through the third via hole 249. At this time, a plurality of third via holes 249 may be configured to secure the connection stability between the third coil pattern 243 and the second connection pattern 244. If the plurality of third via holes 249 are configured, the third via holes 249 are disposed in a line in the longitudinal direction of the second connection pattern 244.

Accordingly, the third coil pattern 243 and the second connection pattern 244 circle the other surface and one surface of the base substrate 210 to form a coil pattern having a spiral shape.

The fourth drawn-out pattern 245 is disposed on the other surface of the base substrate 210. The fourth drawn-out pattern 245 is disposed on the second through path 540, and disposed across the third coil pattern 243. One end of the fourth drawn-out pattern 245 is connected with one of the third coil patterns 243, and the other end of the fourth drawn-out pattern 245 is connected with the fifth drawn-out pattern 246 through a fourth via hole. At this time, one end of the fourth drawn-out pattern 245 is connected with the third coil pattern 243 disposed closest to the center region of the base substrate 210 among the plurality of third coil patterns 243. The fourth drawn-out pattern 245 is connected with the third coil pattern 243 connected with the second coil pattern 241 through the second via hole 247.

The fifth drawn-out pattern 246 is disposed on one surface of the base substrate 210. One end of the fifth drawn-out pattern 246 is connected with the fourth drawn-out pattern 245 through the fourth via hole. The other end of the fifth drawn-out pattern 246 is connected to the terminal 222 of the terminal member 220. As an example, the other end of the fifth drawn-out pattern 246 is connected to the fourth terminal 222d of the terminal member 220.

The coil patterns for short-range communication and wireless power transmission have a change in resistance if the disconnection occurs therein. At this time, the coil pattern for wireless power transmission 240 has a greater change in efficiency according to the change in resistance compared to the coil pattern for short-range communication 230.

Accordingly, in the antenna sheet 200, the coil pattern for short-range communication 230 having a relatively small change in efficiency due to the change in resistance is disconnected to form the first through path 520, and the coil pattern for wireless power transmission 240 is disposed to pass through the first through path 520.

In addition, although the mass productivity increases when the interval between the coil patterns increases, the volume of the combo antenna module 100 increases. Conversely, when the interval between the coil patterns becomes narrow, a short circuit occurs between the coil patterns, thereby lowering the mass productivity.

Accordingly, the antenna sheet 200 is formed to have a set interval (for example, about 100 μm) as the interval between the coil patterns), thereby improving the mass productivity.

The first magnetic member 300 may be a plate-shaped substrate or film made of a magnetic material. The first magnetic member 300 is formed separately from the second magnetic member 400. The first magnetic member 300 is made of a different material from that of the second magnetic member 400 to have different dielectric properties from the second magnetic member 400. As an example, the first magnetic member 300 is a plate-shaped substrate made of a ferrite material.

The first magnetic member 300 is disposed on the other surface of the base substrate 210. The first magnetic member 300 is disposed on a portion of the other surface of the base substrate 210 to overlap the coil pattern for short-range communication 230. At this time, the thickness of the first magnetic member 300 may be formed to be equal to or thinner than the thickness of the second magnetic member 400. That is, the thickness of the first magnetic member 300 may be the thickness of the second magnetic member 400 or less. As an example, the first magnetic member 300 is formed to have a thickness of about 100 μm to 120 μm.

The second magnetic member 400 may be a plate-shaped substrate or film made of a magnetic material. The second magnetic member 400 is formed separately from the first magnetic member 300. The second magnetic member 400 is made of a different material from that of the first magnetic member 300 to have different dielectric properties from the first magnetic member 300.

The second magnetic member 400 may be a plate-shaped substrate on which a plurality of ribbon sheets are laminated. If the ribbon sheet is composed of a single layer, the dielectric properties corresponding to the coil pattern for wireless power transmission 240 may not be implemented. Accordingly, the second magnetic member 400 is configured by laminating the plurality of ribbon sheets. The second magnetic member 400 may be formed by laminating one or more ribbon sheets of a grain alloy ribbon and an iron-based amorphous ribbon in multiple layers. At this time, the second magnetic member 400 may also have an adhesive sheet (not illustrated) interposed between the ribbon sheets.

The second magnetic member 400 is disposed on the other surface of the base substrate 210. The second magnetic member 400 is disposed on a portion of the other surface of the base substrate 210 to overlap the coil pattern for wireless power transmission 240. At this time, the thickness of the second magnetic member 400 may be equal to or larger than the thickness of the first magnetic member 300. That is, the thickness of the second magnetic member 400 may be a thickness greater than or equal to the thickness of the first magnetic member 300. As an example, the second magnetic member 400 is formed to have a thickness of about 120 μm to 130 μm.

Although the preferred exemplary embodiments of the present disclosure have been described above, it is understood that the present disclosure may be modified in various forms, and those skilled in the art may practice various modified examples and changed examples without departing from the scope of the claims of the present disclosure.

The invention claimed is:
1. A antenna module comprising:
a base substrate; and an antenna sheet having coil patterns for wireless power transmission disposed on both surfaces of the base substrate,
wherein the coil pattern for wireless power transmission comprises:
a second coil pattern formed with a plurality of accommodation grooves, and disposed on one surface of the base substrate;
a plurality of third coil patterns disposed to be spaced apart from each other on other surface of the base substrate, and having both ends which face each other and are spaced apart from each other to form a second through path; and
a plurality of second connection patterns disposed in the plurality of accommodation grooves, respectively so that at least some thereof overlap the second through path, and
wherein the plurality of third coil patterns are connected to each other through the plurality of second connection patterns.

2. The antenna module of claim 1,
wherein the second coil pattern is formed so that a line width of a region in which the accommodation groove is formed is narrower than line widths of other regions.

3. The antenna module of claim 2,
wherein the second coil pattern is formed so that a width obtained by summing the line width of the region in which the accommodation groove is formed, a line width of the second connection pattern, and a separation interval between the accommodation groove and the second connection pattern is smaller than or equal to the line widths of other regions.

4. The antenna module of claim 2,
wherein the second coil pattern is disposed in a spiral shape, and a separation interval between the second coil patterns and a separation interval between the second coil pattern and the second connection pattern are the same.

5. The antenna module of claim 1,
wherein at least a portion of the plurality of accommodation grooves overlap the second through path.

6. The antenna module of claim 1,
wherein the coil pattern for wireless power transmission further comprises a fourth drawn-out pattern, and
wherein the fourth drawn-out pattern is connected with one of the plurality of third coil patterns, and disposed across the plurality of third coil patterns on the second through path.

7. The antenna module of claim 6,
wherein the coil pattern for wireless power transmission further comprises:
a third drawn-out pattern disposed on one surface of the base substrate, and connected to one end of the second coil pattern; and
a fifth drawn-out pattern disposed to be spaced apart from the third drawn-out pattern on one surface of the base substrate, and connected with the fourth drawn-out pattern.

8. The antenna module of claim 1,
wherein the coil pattern for wireless power transmission further comprises: a plurality of second via holes penetrating the base substrate to connect the second connection pattern with the third coil pattern, and
wherein a plurality of the second via holes are connected the second connection pattern with the third coil pattern.

9. The antenna module of claim 1,
wherein the base substrate is formed with an accommodation hole and a protrusion, and
wherein the protrusion is extended in an internal direction of the accommodation hole, and
further comprises a terminal member having a plurality of terminals connected to the coil pattern for wireless power transmission, and formed on the protrusion.

* * * * *